United States Patent
Hu et al.

(10) Patent No.: US 11,155,273 B2
(45) Date of Patent: Oct. 26, 2021

(54) METHOD AND APPARATUS FOR ASSESSING COMFORT LEVEL OF DRIVING SYSTEM

(71) Applicant: Beijing Baidu Netcom Science and Technology Co., Ltd., Beijing (CN)

(72) Inventors: Yunyan Hu, Beijing (CN); Yaling Zhang, Beijing (CN); Yue Cui, Beijing (CN); Simin Sui, Beijing (CN); Ji Tao, Beijing (CN); Hui Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 137 days.

(21) Appl. No.: 16/210,833

(22) Filed: Dec. 5, 2018

(65) Prior Publication Data

US 2019/0202466 A1    Jul. 4, 2019

(30) Foreign Application Priority Data

Dec. 28, 2017 (CN) .......................... 201711461762.1

(51) Int. Cl.
*B60W 50/08* (2020.01)
*B60W 50/00* (2006.01)

(52) U.S. Cl.
CPC ........ *B60W 50/0098* (2013.01); *B60W 50/08* (2013.01); *B60W 2050/0028* (2013.01)

(58) Field of Classification Search
CPC ............ B60W 50/0098; B60W 50/08; B60W 2050/0028; B60W 2050/0018; B60W 40/00; G01M 17/007
See application file for complete search history.

(56) References Cited

U.S. PATENT DOCUMENTS

2002/0116156 A1 * 8/2002 Remboski .............. G09B 9/052
702/188
2016/0055236 A1 * 2/2016 Frank .................... G06Q 30/02
707/748

* cited by examiner

*Primary Examiner* — Russell Frejd
*Assistant Examiner* — Ashley L Redhead, Jr.
(74) *Attorney, Agent, or Firm* — Nixon Peabody LLP

(57) ABSTRACT

Illustrative embodiments of the disclosure provide a method and apparatus for assessing a comfort level of a driving system. A method for generating an assessment model for comfort level in a driving system comprises acquiring a first assessment from a user on a comfort level of at least one traveling operation of the driving system, and acquiring a measurement of a traveling indicator of the driving system when performing the at least one traveling operation. The method further comprises generating the assessment model for the comfort level in the driving system based on the first assessment, the measurement of the traveling indicator, and a second assessment from the user on an overall comfort level of the driving system.

24 Claims, 8 Drawing Sheets

METHOD AND APPARATUS FOR ASSESSING COMFORT LEVEL OF DRIVING SYSTEM

CROSS-REFERENCE TO RELATED APPLICATIONS

This application is related to and claims priority from Chinese Application No. 201711461762.1, filed on Dec. 28, 2017 and entitled "Method and Apparatus for Assessing Comfort Level of Driving System," the entire disclosure of which is hereby incorporated by reference.

TECHNICAL FIELD

Embodiments of the disclosure mainly relate to the field of system assessment, and more specifically to a method and apparatus for assessing a comfort level of a driving system.

BACKGROUND

One may depend on different transportation means in daily travel. The transportation means may also be referred to as the driving systems, such as a car, a plane, or a ship. In general, both the passengers and the drivers are interested in knowing the comfort level during the traveling or steering of the transportation means, i.e., whether they will have an enjoyable experience. With the continuous development of artificial intelligence, the research and development of the autonomous driving system has attracted great attention. One of the indicators measuring the performance of the autonomous driving system may include the comfort level.

In the traditional industry manufacturing the transportation means, in order to improve the users' traveling or driving experience, the manufacturers will assess the comfort level of the manufactured transportation means during the drive using certain approaches. Most of the approaches rely only on the subjective assessment of a limited number of users (for example, test drivers) on the driving process, which is difficult to ensure the accuracy and universality of the assessment results, and results in high time and labor costs. In addition, it is difficult to quickly judge the causes for low comfort levels and the improvements that should be made when the subjective assessment results indicate that the comfort level of the driving system is relatively low. Moreover, it is difficult to assess the comfort level of the autonomous driving system using this traditional user subjective assessment solution.

SUMMARY

An illustrative embodiment of the disclosure provides a solution for assessing a comfort level of a driving system.

In a first aspect, the disclosure provides a method for generating an assessment model for comfort level in a driving system. The method includes acquiring a first assessment from a user on a comfort level of at least one traveling operation of the driving system, and acquiring a measurement of a traveling indicator of the driving system when performing the at least one traveling operation. The method further includes generating the assessment model for the comfort level in the driving system based on the first assessment, the measurement of the traveling indicator, and a second assessment from the user on an overall comfort level of the driving system. The generating the assessment model for the comfort level includes generating a first association between the comfort level of the at least one traveling operation and the traveling indicator, and generating a second association between the overall comfort level of the driving system and the comfort level of the at least one traveling operation.

In a second aspect, the disclosure provides a method for assessing a comfort level of a driving system. The method includes acquiring a measurement of a traveling indicator of the driving system when performing at least one traveling operation. The method further includes determining a first assessment on a comfort level of the at least one traveling operation based on a first association between the comfort level of the at least one traveling operation and the traveling indicator included in an assessment model for comfort level, and the measurement of the traveling indicator. The method further includes: determining a second assessment on an overall comfort level of the driving system based on a second association between the overall comfort level of the driving system and the comfort level of the at least one traveling operation included in the assessment model for the comfort level, and the first assessment.

In a third aspect, the disclosure provides an apparatus for generating an assessment model for comfort level in a driving system. The apparatus includes: an assessment acquisition module, configured for acquiring a first assessment from a user on a comfort level of at least one traveling operation of the driving system; a measurement acquisition module, configured for acquiring a measurement of a traveling indicator of the driving system when performing the at least one traveling operation; and a model generation module, configured for generating the assessment model for the comfort level in the driving system based on the first assessment, the measurement of the traveling indicator, and a second assessment from the user on an overall comfort level of the driving system, the model generation module being further configured for: generating a first association between the comfort level of the at least one traveling operation and the traveling indicator, and generating a second association between the overall comfort level of the driving system and the comfort level of the at least one traveling operation.

In a fourth aspect, the disclosure provides an apparatus for assessing a comfort level of a driving system. The apparatus includes: a measurement acquisition module, configured for acquiring a measurement of a traveling indicator of the driving system when performing at least one traveling operation; and a first assessment determining module, configured for determining a first assessment on a comfort level of the at least one traveling operation based on a first association between the comfort level of the at least one traveling operation and the traveling indicator included in an assessment model for comfort level, and the measurement of the traveling indicator; and a second assessment determining module, configured for determining a second assessment on an overall comfort level of the driving system based on a second association between the overall comfort level of the driving system and the comfort level of the at least one traveling operation included in the assessment model for the comfort level, and the first assessment.

In a fifth aspect, the disclosure provides a device, including one or more processors; and a memory, for storing one or more programs, where the one or more programs, when executed by the one or more processors, enable the one or more processors to implement the method according to the first aspect of the disclosure.

In a sixth aspect, the disclosure provides a device, including one or more processors; and a memory, for storing one or more programs, where the one or more programs, when executed by the one or more processors, enable the one or more processors to implement the method according to the second aspect of the disclosure.

In a seventh aspect, the disclosure provides a computer readable medium storing a computer program therein, where the program, when executed by a processor, implements the method according to the first aspect of the disclosure.

An eighth aspect of the disclosure provides a computer readable medium storing a computer program therein, where the program, when executed by a processor, implements the method according to the second aspect of the disclosure.

It should be appreciated that the content described in the summary part is neither intended to limit key or important characteristics of the embodiment of the disclosure, nor used for limiting the scope of the disclosure. Other characteristics of the disclosure will become readily understood based on the following description.

BRIEF DESCRIPTION OF THE DRAWINGS

The above and other characteristics, advantages, and aspects of the embodiments of the disclosure will become more apparent by referring to following detailed description in conjunction with the accompanying drawings. Identical or like reference numerals in the drawings represent identical or similar elements.

DETAILED DESCRIPTION OF EMBODIMENTS

Figure 1:
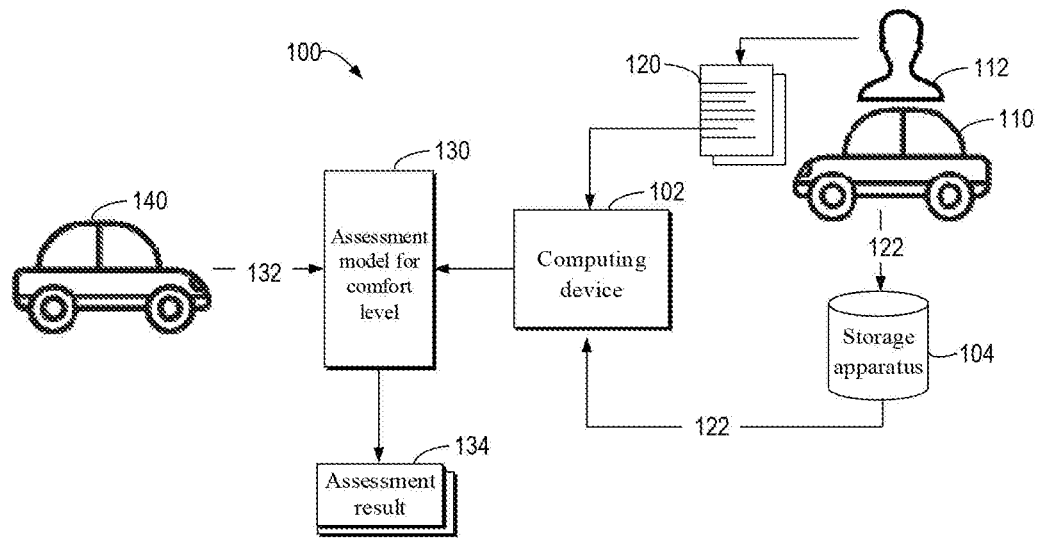
FIG. 1 shows a schematic diagram of an exemplary environment in which a plurality of embodiments of the disclosure can be implemented.

Embodiments of the disclosure will be described in more detail hereinbelow by referring to the accompanying drawings. While some embodiments of the disclosure are shown in the drawings, it should be understood that the disclosure may be implemented in various forms, and should not be construed as limited to the embodiments set forth herein. Rather, these embodiments are provided for more thorough and complete understanding of the disclosure. It should be understood that the drawings and embodiments of the disclosure are only used as examples, rather than limiting the scope of protection of the disclosure.

In the description on embodiments of the disclosure, the term "include" and wordings similar to the term should be understood as open-ended inclusion, i.e., "including but not limited to." The term "based on" should be understood as "at least partially based on." The term "one embodiment" or "the embodiment" should be understood as "at least one embodiment." The terms, such as "first," and "second," may refer to different or identical objects. Other explicit and implicit definitions may also be included hereinafter.

As mentioned above, an assessment on a comfort level of a driving system is implemented by subjective assessment of limited number of users on the comfort level of the driving system according to the conventional solution. Such a solution is defective in accuracy, universality, and costs. For example, because of the influence of subjective factors of limited number of users, it is difficult to ensure the accuracy of the assessment on a particular driving system, nor do transversal comparisons of the assessment results of a plurality of driving systems have any reference value. Although the accuracy and comparability may be improved by assessing a plurality of driving systems using a large number of same user groups, this is not feasible in practical applications, because of very high time and labor costs. In addition, such a subjective assessment solution is difficult to give causes for low comfort levels and indications for improvements, and is impossible to be applicable to assessment on the comfort level of an autonomous driving system.

An embodiment of the disclosure proposes a solution for assessing a comfort level of a driving system. In this solution, a quantitative assessment result of a comfort level of a particular driving system is determined using a modeling method. An assessment model for comfort level in a driving system can determine comfort level assessment based on an objective measurement of a traveling indicator. During the model training process, a corresponding association is generated using training data, to obtain a hierarchical assessment model for comfort level. The generating the assessment model for the comfort level includes generating an association between the overall comfort level of a driving system and the comfort level of one or more traveling operations, and generating an association between the comfort level of each traveling operation and the measurement of one or more traveling indicators.

During the process of using the model, assessment on the comfort level of the each traveling operation is determined using a corresponding association in the trained assessment model for the comfort level based on the measurement of the traveling indicator of the particular driving system when performing the one or more traveling operations, and the overall comfort level of the driving system is determined based on the comfort levels of the traveling operations. The comfort level of the driving system may be assessed based on objective indicators of the driving system with the help of the hierarchical model. The model may be conveniently applied to assessment on the comfort level of an autonomous driving system and a non-autonomous driving system, and provides a comparable assessment result.

As used herein, the term "model" may learn an association between corresponding inputs and outputs from the training data, to generate a corresponding output for a given input after completing training. It should be understood that, the "model" may also be referred to as a "neural network," a "learning model," or a "learning network."

In the embodiment of the disclosure, the driving system may include at least one of an autonomous driving system or a non-autonomous driving system. The autonomous driving system refers to a driving system that may partially or completely perform automated traveling operations, and may include at least one of software or a mechanical system of the autonomous driving system. The non-autonomous driving system refers to a mechanical driving system with traveling operation instructions completely given by human. The driving system may be any system that can carry at least one of people or objects and moves through a power system such as an engine, including various vehicle driving systems, airplane driving systems, or ship driving systems. Hereinafter, embodiments of the disclosure will be discussed by taking a vehicle driving system as an example. However, it should be understood that the solution of the disclosure may also be similarly applied to other types of driving systems.

Embodiments of the disclosure will be specifically described hereinbelow by referring to the accompanying drawings.

FIG. 1 shows a schematic diagram of an exemplary environment 100 in which a plurality of embodiments of the disclosure can be implemented. In the exemplary environment 100, an assessment model for comfort level 130 is generated by a computing device 102. The computing device 102 may train the assessment model for the comfort level in a driving system based on training data.

In order to train the assessment model for the comfort level in the driving system, corresponding training data need to be collected. The to-be-collected training data are associated with an architecture of the assessment model 130 for the comfort level, and include subjective assessment 120 from a user on a comfort level associated with a driving system 110 and an objective measurement 122 of traveling indicators of the driving system. In a training data acquisition stage, the user 112 may take the driving system 110 (in this example, the driving system 110 is a vehicle) or drive the driving system 110, and collect the training data at least in or after the process. While FIG. 1 shows a user 112 and a driving system 110, in some embodiments, a plurality of users may take a plurality of driving systems, and collect the corresponding training data. During the process of collecting the subjective assessment 120, the user 112 may manually write or input the subjective assessment 120 through a terminal device when the user 112 is taking or driving the driving system 110 or in a subsequent period.

According to the embodiment of the disclosure, the subjective assessment 120 on a comfort level collected from the user 112 includes an assessment (referred to as a "first assessment" hereinafter to facilitate discussion) from the user 112 on a comfort level of at least one traveling operation of the driving system 110, and an assessment (referred to as a "second assessment" hereinafter to facilitate discussion) on an overall comfort level of the driving system 110. Since the traveling process of the driving system 110 relates to one or more traveling operations, the assessment model 130 for the comfort level according to the embodiment of the disclosure considers an association between the overall comfort level of the driving system 110 and the comfort level of one or more traveling operations.

Figure 2:
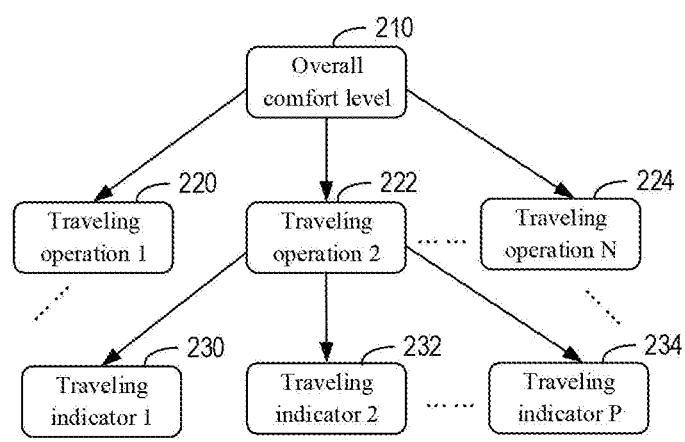
FIG. 2 shows a schematic diagram of analysis on factors affecting an overall comfort level of a driving system according to some embodiments of the disclosure.

Specifically, as shown in FIG. 2, the overall comfort level 210 of the driving system 110 may be associated with a traveling operation 1 220, a traveling operation 2 222, . . . , and a traveling operation N 224. Specific traveling operations may be associated with the targeted driving system 110. In the exemplary vehicle driving system 110, the traveling operations may include the operations, such as start, going straight, turn, lane change, and parking. Therefore, the to-be-established assessment model for the comfort level may include the association between the overall comfort level of the driving system 110 and the comfort levels of the traveling operations. The training data required to establish the model may include assessment on the comfort level of a corresponding traveling operation. Such assessment may be obtained by assessing the comfort level on different traveling operations by the user taking the corresponding driving system 110.

When the driving system 110 is traveling, as mentioned above, the measurement 122 of the traveling indicator of the driving system 110 is further collected for use as the training data of the assessment model 130 for the comfort level. In some embodiments, the measurement 122 of the traveling indicator may be monitored by a corresponding sensor of the driving system 110 or other measuring device. The measurement of the traveling indicator may be provided and stored in a storage apparatus 104.

According to the embodiment of the disclosure, a desired assessment model 130 for comfort level to be obtained by training may give a subjective comfort level assessment result from the user based on the objective measurement 122 of the traveling indicator. Specifically, in the embodiment of the disclosure, the comfort level of the traveling operation of the driving system 110 is associated with the measurement of the traveling indicator of the driving system 110 when performing the at least one traveling operation, and thus the measurement 122 is obtained for use as a part of the training data. As shown in FIG. 2, the traveling operation 222 may be associated with a plurality of traveling indicators, including a traveling indicator 1 230, a traveling indicator 2 232, . . . , and a traveling indicator P 234. Other traveling operations 220, and 224 may also have associated traveling indicators. The number and types of the traveling indicators associated with different traveling operations may be identical or different.

As used herein, the traveling indicator refers to various indicators of the driving system 110 when performing a specific traveling operation during traveling. Examples of the traveling indicators include, but are not limited to: a current velocity, an acceleration, an acceleration change rate, a duration of the acceleration continuously exceeding a threshold, a throttle amount, an angular velocity of a steering wheel, an angle of a steering wheel, a positive and negative change frequency of a steering wheel, a curvature radius, a curvature radius change rate, an accelerator/brake switching frequency, and a braking amount. In some examples, certain traveling indicators may be further detailed. For example, the acceleration may be further detailed to a longitudinal positive and/or negative acceleration, and a perpendicular positive and/or negative acceleration; the acceleration change rate may be further detailed to a longitudinal positive and/or negative acceleration change rate, and a perpendicular positive and/or negative acceleration change rate. In some examples, only some of the forgoing traveling indicators are considered, and in other examples, other traveling indicators may be considered.

In order to train the assessment model 130 for comfort level, the computing device 102 acquires the collected training data. Specifically, the computing device 102 acquires the assessment 120 from the user 112 on the comfort level of the driving system 110, including the first assessment on the comfort level of the at least one traveling operation and the second assessment on the overall comfort level of the driving system 110. If the subjective assessment 120 is recorded by the user in handwriting, the corresponding assessment result may be digitized by, e.g., scanning, and the digitalized assessment 120 is provided to the computing device 102. If the user 112 inputs the corresponding subjective assessment through a terminal device in the acquisition stage, then the computing device 102 may acquire the assessment 120 from the terminal device.

The computing device 102 further acquires the measurement 122 of the traveling indicator of the driving system 110 when performing the at least one traveling operation. In some embodiments, the first assessment from the user on the comfort level of the traveling operation and the measurement of the traveling indicator may have corresponding timestamps. After acquiring the first assessment on the comfort level of the traveling operation and the objective measurement of the traveling indicator, correspondence between the measurement of the traveling indicator and the corresponding traveling operation may be determined based on the corresponding timestamps. In this way, the computing device 102 may determine the measurement of the traveling indicator corresponding to the traveling operation of the driving system 110.

The computing device 102 generates the assessment model 130 for the comfort level in the driving system 110 based on the first assessment, the measurement of the traveling indicator, and the second assessment from the user on the overall comfort level of the driving system 110. The generating the assessment model 130 for the comfort level includes generating an association (referred to as a "first association" hereinafter to facilitate discussion) between the comfort level of the at least one traveling operation and the traveling indicator, and generating an association (referred to as a "second association" hereinafter to facilitate discussion) between the overall comfort level of the driving system 110 and the comfort level of the at least one traveling operation. The generated assessment model for the comfort level described in more detail hereinbelow based on the embodiment of FIG. 3.

Figure 3:
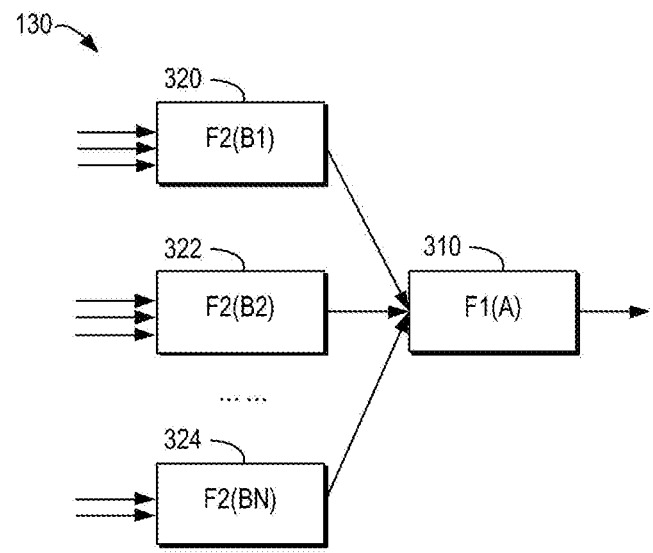
FIG. 3 shows a schematic diagram of an exemplary structure of an assessment model for comfort level according to some embodiments of the disclosure.

FIG. 3 shows an exemplary structure of an assessment model for comfort level 130 according to an embodiment of the disclosure. The assessment model 130 for the comfort level includes a module 310 for assessing the overall comfort level of the driving system 110 and modules 320, 322, . . . , and 324 for assessing the comfort levels of the traveling operations. The modules 320, 322, . . . , and 324 may be trained based on the first assessment from the user on the comfort level of the corresponding traveling operation of the driving system 110 and the measurement of the traveling indicator. The trained modules 320, 322, . . . , and 324 denote the first association between the comfort level of the corresponding traveling operation and the traveling indicator. For example, for the module 322, suppose the part is used for a traveling operation "going straight", and a set of sensory experiences associated with the "going straight" is expressed as B2, then the first association of the module 322 may be expressed as F2(B2). For the modules 320 and 324 corresponding to other traveling operations, they may also be trained using corresponding training data, to obtain a corresponding first association F2(B1), F2(BN).

The module 310 may be trained based on the first assessment from the user on the comfort level of the corresponding traveling operation of the driving system 110 and the second assessment on the overall comfort level of the driving system 110. The trained module 310 denotes the second association between the overall comfort level of the driving system 110 and the comfort level of the at least one traveling operation, and is expressed as F1(A), where A denotes a set of to-be-considered traveling operations.

Figure 4:
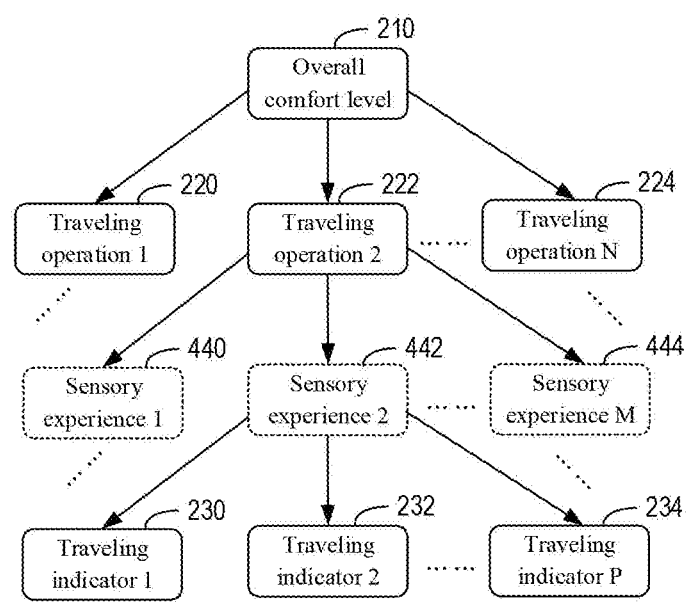
FIG. 4 shows a schematic diagram of analysis on factors affecting an overall comfort level of a driving system according to some other embodiments of the disclosure.

In some embodiments, the inventor further finds that the comfort level of each traveling operation may be associated with the comfort level from the user on one or more sensory experiences of the driving system 110 when performing the traveling operation. For example, FIG. 4 shows another schematic diagram of analysis on the overall comfort level of the driving system 110. Similar to the example in FIG. 2, the overall comfort level 210 may be associated with a traveling operation 1 220, a traveling operation 2 222, . . . , and a traveling operation N 224. Furthermore, the each traveling operation may be directly associated with the one or more sensory experiences. For example, as shown in FIG. 4, the traveling operation 222 may be associated with a sensory experience 1 440, a sensory experience 2 442, . . . , and a sensory experience M 444. The number and types of the sensory experiences associated with different traveling operations may be identical or different.

Furthermore, each sensory experience of the traveling operation may be associated with the measurement of the traveling indicator of the driving system 110 when the user has the sensory experience. For example, as shown in FIG. 4, the sensory experience 442 associated with the traveling operation 2 222 may be further associated with the traveling indicator 230, the traveling indicator 232, . . . , and the traveling indicator 234. Other sensory experiences associated with the traveling operation 222, and other traveling operations may also have associated traveling indicators. The number and types of the traveling indicators associated with different traveling operations and different sensory experiences may be identical or different.

As used herein, the sensory experiences relate to the physiological somatosensation of the user in different traveling operations. Table 1 hereinbelow lists description on some exemplary sensory experiences and possible causes for such sensory experiences.

TABLE 1

Description on Sensory Experiences and Possible Causes

| Sensory experience | Description | Possible causes |
| --- | --- | --- |
| Acceleration feel | cause one to feel his back being pressed by the back of the chair and pushed forward | Feeling brought by increasing vehicle velocity due to pressing accelerator when performing the vehicle start, overtaking, etc. |
| Centrifugal feel | cause one to feel being pressed in a transversal direction or being thrown out | Feeling of being centrifuged from side to side due to the steering of the steering wheel when performing lane change, turn, left/right turn, turn around, etc. |
| Jolt feel | cause one to have a feeling of leaving the seat to the air, accompanied by a certain feeling of weightlessness | Bounce in the perpendicular direction when passing through an uneven road, a speed bump, or a slope on a road |

TABLE 1-continued

Description on Sensory Experiences and Possible Causes

| Sensory experience | Description | Possible causes |
|---|---|---|
| Feeling of leaning forward | cause one to have a feeling of leaning forward or a certain degree of nodding | Feeling brought by continuously slowing vehicle velocity due to pressing brake during the operations, such as deceleration for collision avoidance or parking |
| Frustration feel | cause one to have a feeling of unsmooth traveling or carsickness | Feeling of continuously intermittent braking caused by frequent acceleration/braking of vehicle in a short time due to following vehicles, passing through people streams or continuously avoiding obstacles |
| Wobble feel | cause one to have a feeling of unsafe and insecure vehicle traveling strategy, and wobbly behavior trace | Feeling of wobbly wheel path caused by frequent wobble from side to side of vehicle steering wheel in case of vehicle system failure or decision on specific problems |
| Feeling of environmental oppression | cause one to have a feeling of being oppressed or have a psychological burden because of presentiment of a possible accident | Visual and psychological feeling of tension caused by no reasonable or timely safe decision of vehicle when a large truck with great inertia, or people/obstacle on the road is quickly approaching |

It should be understood that Table 1 only shows examples of the sensory experiences of passengers and/or drivers of the driving system 110 during traveling and possible causes for producing the corresponding sensory experiences. In other examples, other sensory experiences may be further analyzed, or each of the sensory experiences is detailed. The scope of the disclosure is not limited in this respect.

In some embodiments, in order to further model the association between the comfort level of the traveling operation and the comfort level of the sensory experience and the association between the comfort level of the sensory experience and the traveling indicator, the user 112 may further assess the comfort level of the sensory experience of the driving system 110 when performing the at least one traveling operation, to obtain an assessment (referred to as a "third assessment" hereinafter to facilitate discussion) on the comfort level of the sensory experience in the training data acquisition stage. The third assessment may also be included in the subjective assessment 120.

When training the comfort level assessment module 130, the computing device 102 may acquire the third assessment from the user 112 on the comfort level of the sensory experience of the driving system 110 when performing the at least one traveling operation. The acquisition of the third assessment is similar to that of the first assessment and the second assessment. The computing device 102 may generate an association (referred to as a "third association" hereinafter to facilitate discussion) between the comfort level of the at least one traveling operation and the comfort level of the sensory experience based on the first assessment and the third assessment. The computing device 102 further generates an association (referred to as a "fourth association" hereinafter to facilitate discussion) between the comfort level of the sensory experience and the traveling indicator based on the third assessment and the measurement of the traveling indicator. In this case, the first association between the comfort level of the traveling operation and the traveling indicator may include the third association and the fourth association.

Figure 5:
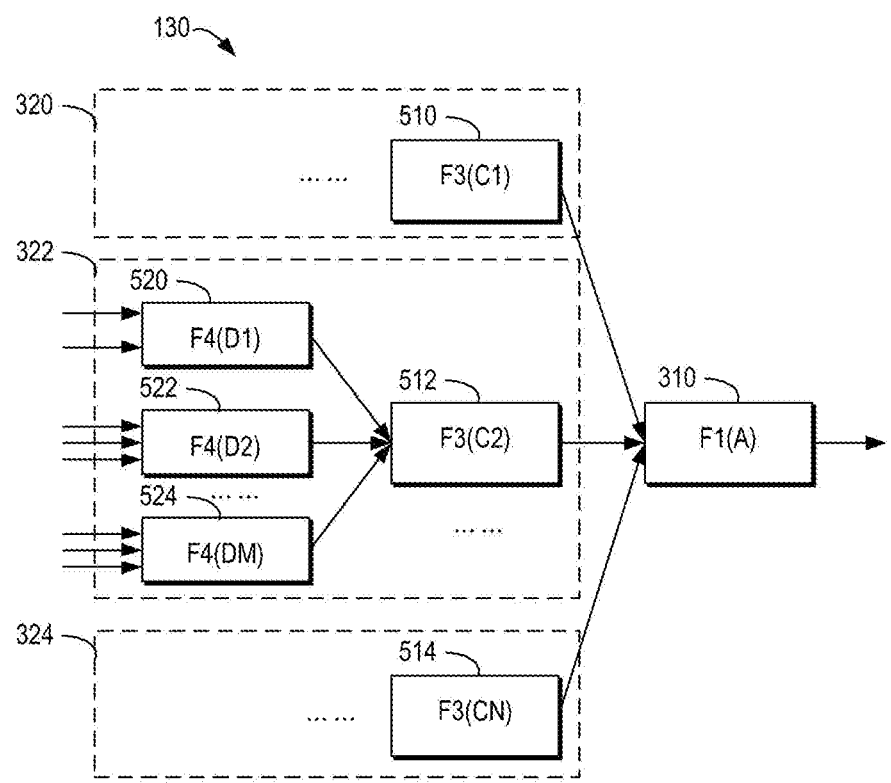
FIG. 5 shows a schematic diagram of an exemplary structure of an assessment model for comfort level according to some other embodiments of the disclosure.

FIG. 5 shows another example of an assessment model 130 for comfort level according to an embodiment of the disclosure. In the example of FIG. 5, the modules 320, 322, . . . , and 324 denoting the first association between the comfort levels of the traveling operations and the traveling indicators are further divided into submodules denoting the third association and submodules denoting the fourth association. For example, the module 322 may include a submodule 512 denoting the third association between the comfort level of the corresponding traveling operation and the comfort level of a plurality of sensory experiences, and may include submodules 520, 522, . . . , and 524 denoting the fourth association between the comfort level of the sensory experiences associated with the corresponding traveling operation and the traveling indicators.

In an example, assuming that the submodule 512 is specific to a traveling operation "going straight", and the set of sensory experiences associated with the "going straight" is expressed as C2, then the third association to be learned by the submodule 512 may be expressed as F3(C2). The computing device 102 may train the submodule 512 based on the first assessment on the comfort level of the traveling operation corresponding to the module 322 and the third assessment on the comfort levels of the sensory experiences associated with the traveling operation, to generate the third association F3(C2).

The submodules 520, 522, . . . , and 524 correspond to the comfort level of each sensory experience associated with the "going straight"respectively. For example, for the submodule 520, assume that this part is used for the "frustration feel" of the "going straight", and the set of traveling indicators associated with the "frustration feel" of the "going straight" is expressed as D1. The computing device 102 may generate the fourth association of the submodule 520 expressed as F4(D1) based on the third assessment on the comfort level of the "frustration feel" of the "going straight" and the measurement of the traveling indicators D1. For other submodules 522, . . . , and 524, the corresponding fourth associations F4 (D2) , . . . , and F4 (DM) may also be generated using corresponding training data. The modules 320, and 324 corresponding to the comfort levels of other traveling operations may be further divided into submodules similar to the submodules 512, 520, 522, . . . , and 524.

In some embodiments, various types of models, learning networks, or neural networks may be used for designing the assessment model 130 for the comfort level or modules of the model. In some embodiments, the assessment model 130 for the comfort level may be trained using different model training methods (including a back propagation method, a forward propagation method, or the like). The modules of the assessment model 130 for the comfort level may be separately trained using corresponding training data, to enable the modules to converge respectively. In other embodiments, all modules of the assessment model 130 for the comfort level may also be trained using a combined method, to enable the training results of a plurality of the modules to achieve overall convergence of the assessment model 130 for the comfort level.

In some embodiments, after the assessment model 130 for the comfort level achieves convergence or fitting, the computing device 102 may calibrate the assessment model 130 for the comfort level using new training data. For example, the computing device 102 may input training data corresponding to inputs of the modules of the model 130 in the training data into corresponding modules, and determine whether there is an error between the inputs of the corresponding modules and the actual outputs in the training data. If the error exists, the assessment model 130 for the comfort level may be further iteratively updated, to enable the assessment model 130 for the comfort level to further converge. In this way, the assessment model 130 for the comfort level may be used for more accurately assessing the comfort level of the driving system 110.

It should be understood that while FIG. 2 and FIG. 4 show different traveling operations, associated different traveling indicators, and associated different sensory experiences, these are only given as examples. In other embodiments, other number (e.g., one) of the traveling operations, the traveling indicators, or the sensory experiences may also be determined to be associated with each other. In this case, modules in the assessment model 130 for the comfort level of FIG. 3 or FIG. 5 may also be changed accordingly.

The above embodiments discuss the to-be-acquired subjective assessment 120 on the comfort level of the driving system 110, such as assessment on the overall comfort level, the comfort levels of the traveling operations, and the comfort levels of the sensory experiences. In some embodiments, in order to obtain unified and comparable comfort level assessment results, a range of scores for the comfort levels associated with the assessments may be divided a plurality of comfort level gradings, for using by the user in the assessment process. The comfort level gradings may correspond to different score intervals in the range of scores for the comfort levels. In this way, it may be convenient for the user to provide a unified and comparable comfort level assessment result in the assessment process.

The dividing the range of scores for the comfort levels may be implemented in a variety of ways. In some embodiments, historical assessment data for a comfort level of a reference driving system may be acquired, such as a comfort score selected from the range of scores for the comfort levels and a corresponding comfort level grading. In one example, users may be enabled to take or drive a driving system corresponding to a discomfortable grading, a driving system corresponding to a relatively comfortable grading, and a driving system corresponding to a comfortable grading, and then give reference scores of the overall comfort levels of the driving systems. In some embodiments, the reference driving system may include an autonomous driving system or a non-autonomous driving system. For the non-autonomous driving system, drivers having different driving experiences may drive the non-autonomous driving system, and users as passengers score the experiences of the comfort level of the non-autonomous driving system. For the autonomous driving system, passengers may travel by driving systems corresponding to different comfort level gradings, and score the experiences of the comfort level gradings.

The obtained historical assessment data may be pre-stored in a memory of the computing device 102 or other accessible memory (e.g., the memory 104) of the computing device 102. Then, the historical assessment data may be clustered to determine corresponding score intervals of the plurality of comfort level gradings in the range of scores for the comfort levels. In the clustering process, each reference score and a comfort level grading of the driving system giving the reference score may be used as a point, and a plurality of points are clustered.

Figure 6:
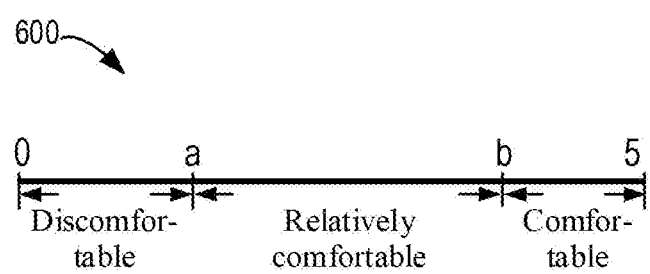
FIG. 6 shows a schematic diagram of division of comfort level gradings in an exemplary range of scores for the comfort level according an embodiment of the disclosure.

FIG. 6 shows an exemplary range 600 of scores for the comfort levels. In this example, the range 600 of scores for the comfort levels is set as 0 to 5, where an interval from 0 to a corresponds to a discomfortable grading, an interval from a to b corresponds to a relatively comfortable grading, and an interval from b to 5 corresponds to a comfortable grading. It should be understood that FIG. 6 only provides a specific example of a range of scores for the comfort levels and grading division thereof. In other examples, other range of scores for the comfort levels may be provided, and may be divided into more or fewer comfort level gradings. In the example of FIG. 6, the division of the comfort level gradings is determined by, for example, clustering the historical assessment data for the comfort levels of the reference driving system. The providing the range of scores for the comfort levels, the dividing the comfort level grading interval, and the like may be implemented by the computing device 102, or implemented by another device.

It should be understood that the above discussion relating to the dividing the range of scores for the comfort levels is merely illustrative, rather than limiting. Those skilled in the art can fully appreciate that the range of scores for the comfort levels may also be divided in other suitable ways within the scope of the disclosure. For example, an interval boundary (e.g., a and b in FIG. 6) of the comfort level gradings may also be set as a predetermined value. For example, the score interval corresponding to each comfort level grading may be uniformly distributed within the range of scores.

The training the assessment model 130 for the comfort level is discussed hereinbefore. The trained assessment model 130 for the comfort level may be used for assessing the comfort level of the driving system. Use of the assessment model 130 for the comfort level may be implemented by at least one of the computing device 102 or other computing device having a computing capability. The assessment model 130 for the comfort level may be implemented by at least one of a software module, firmware, or hardware in the computing device 102, or other computing device, or any combination thereof.

Discussions will be provided hereinbelow by taking the computing device 102 using the assessment model 130 for the comfort level as an example. In some embodiments, the computing device 102 may assess the comfort level of the be-be-assessed driving system 140 using the assessment model 130 for the comfort level. In some examples, the computing device 102 may assess the driving system 140 in response to a user request for assessment or other triggering condition.

In order to implement comfort level assessment, the computing device 102 acquires the measurements 132 of the traveling indicators of the driving system 140 when performing one or more traveling operations. Here, the driving system 140 is the to-be-assessed driving system 140. The type of the to-be-acquired traveling indicator depends on input requirements of the to-be-used assessment model 130 for the comfort level. The measurement 132 of the traveling indicator may be implemented by a corresponding sensor or other monitoring device of the driving system 140, and then be provided to the computing device 102.

The computing device 102 determines assessment on the comfort level of the one or more traveling operations based on the first association between the comfort level of the at least one traveling operation and the traveling indicator included in the assessment model 130 for the comfort level, and the measurement 132 of the acquired traveling indicator. In the example of FIG. 3, the modules 320, 322, . . . , and 324 denote such a first association, and the measurement 132 of the traveling indicator may be used as the inputs of the modules 320, 322, ..., and 324. Based on the first association denoted by the modules 320, 322, ..., and 324, the computing device 102 may obtain the outputs of the models 320, 322, ..., and 324 for use as the first assessment on the comfort levels of the corresponding traveling operations.

Furthermore, the computing device 102 determines a second assessment on the overall comfort level of the driving system 140 based on the second association between the overall comfort level of the driving system 140 and the comfort level of the at least one traveling operation included in the assessment model 130 for the comfort level, and the first assessment. In the example of FIG. 3, the module 310 denotes such a second association, and the first assessment from the modules 320, 322, ..., and 324 may be used as the inputs of the module 310. Based on the second association denoted by the module 310, the computing device 102 may obtain the outputs of the model 310 for use as the second assessment on the overall comfort level of the driving system 140.

In some embodiments, the first association denoted by the modules 320, 322, ..., and 324 includes the third association between the comfort level of the traveling operation and the comfort level of the sensory experience, and the fourth association between the comfort level of the sensory experience and the traveling indicator. Such a third association is denoted by, for example, submodules 510, 512, ..., and 514 in the module 322 of the assessment model 130 for the comfort level in FIG. 5. The fourth association may be denoted by, for example, submodules associated with the sensory experiences in the model 130, such as submodules 520, 522, ..., and 524 in the module 322, and similar submodules in other modules 320, and 324.

When determining the first assessment on the comfort level of the traveling operation, the computing device 102 may determine the third assessment from the user on the comfort levels of the sensory experiences when performing each of the traveling operations based on the fourth association (for example, the submodules 520, 522, ..., and 524 in the module 322, and other submodules in the same layer) and the measurement of the traveling indicator. The measurements of the traveling indicators associated with submodules of different sensory experiences may be used as inputs of the submodules, and the outputs of the submodules are considered as a third assessment on the comfort levels of the corresponding sensory experiences. The computing device 102 further determines first assessment on the comfort level of each traveling operation based on the third assessment and the third association (e.g., the submodules 510, 512, ..., and 514). The third assessment on the comfort levels of sensory experiences corresponding to the submodules 510, 512, ..., and 514 may be used as inputs of the submodules, and the outputs of the submodules 510, 512, ..., and 514 may be used as assessment, i.e., first assessment, on the comfort level for the traveling operation.

In some embodiments, the comfort level assessment (including the assessment on at least one of the overall comfort level, the comfort level of the traveling operation, or the comfort level of the sensory experience) may be a score in a preset range of scores for the comfort level. The range of scores for the comfort level may be consistent with the range of scores for the comfort level used in the training stage of the assessment model 130 for the comfort level.

As may be appreciated through the above process, the established assessment model 130 for the comfort level is used for determining the score of the overall comfort level of the to-be-assessed driving system 140. By selecting training data (for example, collecting corresponding training data for a plurality of driving systems), the trained assessment model 130 for the comfort level may be used for assessing driving systems produced by different manufacturers and different providers. For example, for an autonomous driving system, the assessment model for the comfort level may be used for assessing comfort levels of different versions of the driving system, to facilitate version upgrade.

In some embodiments, the assessment model 130 for the comfort level determines assessment on the overall comfort levels of different driving systems 140, and the assessment results may be compared with each other, to determine the differences in the comfort levels of the different driving systems 140. The assessment model 130 for the comfort level may be further used for assessing different versions (e.g., different software versions of the autonomous driving system 140) of the driving system 140, to determine the differences in the comfort levels of the different versions.

In some embodiments, the computing device 102 provides an indication of the second assessment on the overall comfort level of the driving system 140, for use as an assessment result 134 of the assessment model 130 for the comfort level. For example, the value of assessment on the overall comfort level may be presented to the user. Alternatively or additionally, the computing device 102 may further provide an indication of the first assessment on the comfort levels of the traveling operations and the third assessment on the comfort levels of associated sensory experiences, to enable the user to view the corresponding assessment results 134. The computing device 102 may present the assessment results using a variety of presentation modes. The presentation modes include text, images, graphs, audio, and/or video. By analyzing the presented assessment on the comfort level, the developer of the driving system 140 may debug the assessed driving system 140 (e.g., adjusting a corresponding mechanical structure of the autonomous driving system or non-autonomous driving system 140, or adjusting a software program of the autonomous driving system 140), to facilitate further improving the comfort level of the driving system 140. In some cases, because the comfort level assessment results in different aspects (e.g., traveling operation, and sensory experience) may be presented, the driving system 140 may be more targetedly debugged.

In some embodiments, the computing device 102 may automatically analyze the comfort level assessment result 134, and give the analysis result. In some embodiments, the computing device 102 may compare a value of the second assessment on the overall comfort level of the driving system 140 with an overall comfort level threshold. An indication of the overall comfort level of the driving system 140 meeting comfort requirements is provided, in response to the value of the second assessment being greater than the overall comfort level threshold. Through this indication, the users (including a user or the developer of the driving system 140) may determine the overall comfort level of the driving system 140 meeting the requirements.

In some embodiments, if the assessment on the overall comfort fails to meet the requirements (e.g., less than the overall comfort level threshold), it may be desirable to debug the driving system 140 by the developer, to improve the comfort level of the driving system 140. In this case, a value of the first assessment on the comfort level of the traveling operation is compared with a comfort level threshold of an operation associated with the traveling operation, when the value of the second assessment on the overall comfort level is less than the overall comfort level threshold. If the value of the first assessment on the comfort level of a traveling operation is less than the comfort level threshold of the corresponding operation, an indication of the traveling indicator associated with the traveling operation may be provided. Such a traveling indicator may be determined by analyzing a type of a part of inputs for sensory experience associated with the first traveling operation in the assessment model 130 for the comfort level. By providing the indication of the traveling indicator, the system developer may determine the causes which are likely to affect the overall comfort level or the comfort level of the traveling operation based on the indicated traveling indicator, to facilitate debugging the driving system 140 for the traveling indicators, and to improve the corresponding comfort level. The provided indication may be at least one of a name of the traveling indicator or the measurement of the traveling indicator.

In some embodiments, if the value of the second assessment on the overall comfort level is less than the overall comfort level threshold, not only the indication of the traveling indicator affecting the comfort level of the corresponding traveling operation is provided, but also, or alternatively, an indication of the traveling operation having the comfort level assessment value less than the comfort level threshold of the operation may be provided. The indication of a traveling operation may facilitate debugging the driving system 140. In some embodiments, not only the comfort level assessment on each traveling operation is analyzed, but also the comfort level assessment on the sensory experience associated with the each traveling operation may be similarly analyzed.

In some embodiments, the computing device 102 may further present various aspects affecting the overall comfort level, in response to a request from the user, including at least one of the comfort level of the traveling operation, the comfort level of the sensory experience or the traveling indicator.

Figure 7:
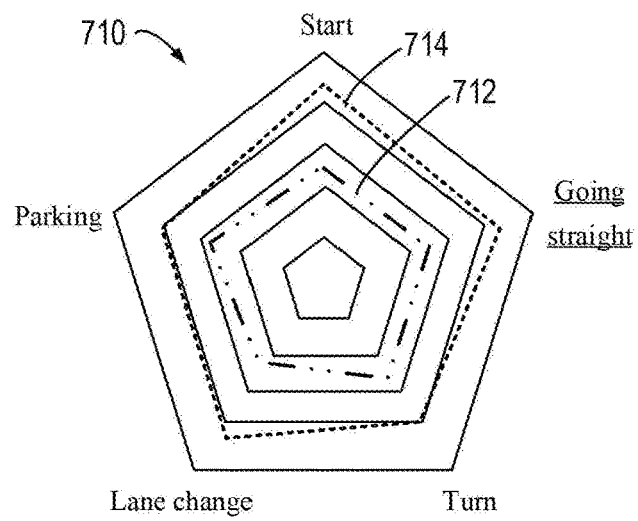
FIG. 7 shows a schematic diagram of presentation of an assessment result of a comfort level for a driving system according to an embodiment of the disclosure.
Figure 7:
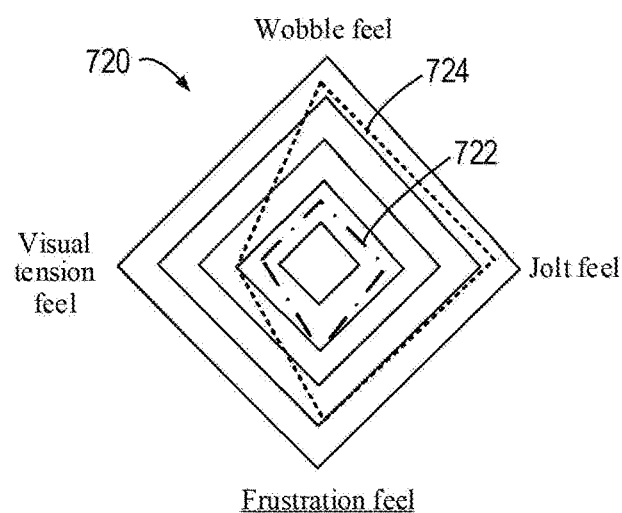
Figure 7:
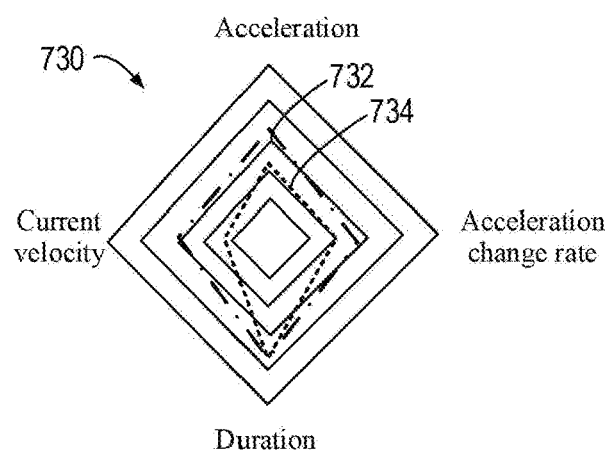

FIG. 7 shows a schematic diagram of presentation of a comfort level assessment result for a driving system based on an embodiment of the disclosure. The result may be presented by the user interface of the computing device 102. As shown in the figure, a pattern 710 shows possible range of scores for the comfort levels for different traveling operations. In the example of FIG. 7, the traveling operations affecting the overall comfort level of the driving system may include start, going straight, turn, lane change, and parking. A pattern 714 shows the comfort level assessment on different traveling operations determined by the assessment model 130 for the comfort level (expressed by vertexes of the pattern 714). To enable the user to more clearly understand whether the assessment result meet the requirements, a pattern 712 shows the comfort level thresholds for different traveling operations (expressed by vertexes of the pattern 712), and the thresholds for different traveling operations may be different. As can be seen, the assessment result shows that the comfort levels of different traveling operations meet the threshold requirements.

In some embodiments, the user may further view factors affecting the comfort levels of different traveling operations downwardly. The user may initiate such a request for view via an input device. If the user expects to view factors affecting the "going straight", the assessment on the comfort levels associated with the sensory experiences deciding the "going straight" may be further presented, as shown in a pattern 720. In this example, the sensory experiences affecting the comfort level of the "going straight" may include a wobble feel, a jolt feel, a frustration feel, and a visual tension feel. A pattern 724 shows the comfort level assessment on different sensory experiences determined by the assessment model 130 for the comfort level (expressed by vertexes of the pattern 724). A pattern 722 shows the comfort level thresholds of different sensory experiences (expressed by vertexes of the pattern 722). As can be seen, the assessment result shows that the comfort levels of different traveling operations meet the threshold requirements.

Furthermore, the traveling indicator affecting the comfort level each sensory experience may also be presented in response to a user's request or automatically. A pattern 730 shows a measurement of the traveling indicator affecting the "frustration feel" when the driving system is "going straight". In the example, the measurements of different traveling indicators are normalized. A pattern 734 shows measurements (expressed by vertexes in the pattern 734) of the traveling indicators when the driving system is "going straight", including an acceleration, an acceleration change rate, a duration of the acceleration continuously exceeding a threshold, and a current velocity. A pattern 732 shows thresholds of measurements for different traveling indicators (expressed by vertexes in the pattern 732). As can be seen, none of the acceleration, the acceleration change rate, and the current velocity meets predetermined requirements. In this case, the traveling indicators may be improved by debugging the driving system, to enable the corresponding sensory experiences to have higher comfort levels. The improving the comfort level of the sensory experience also contributes to further enhancing the comfort level of the corresponding traveling operation, and then further enhancing the overall comfort level of the driving system. Therefore, the comfort levels in different aspects of the driving system may be targetedly improved by continuously mining and analyzing the causes affecting the comfort levels in various aspects.

Figure 8:
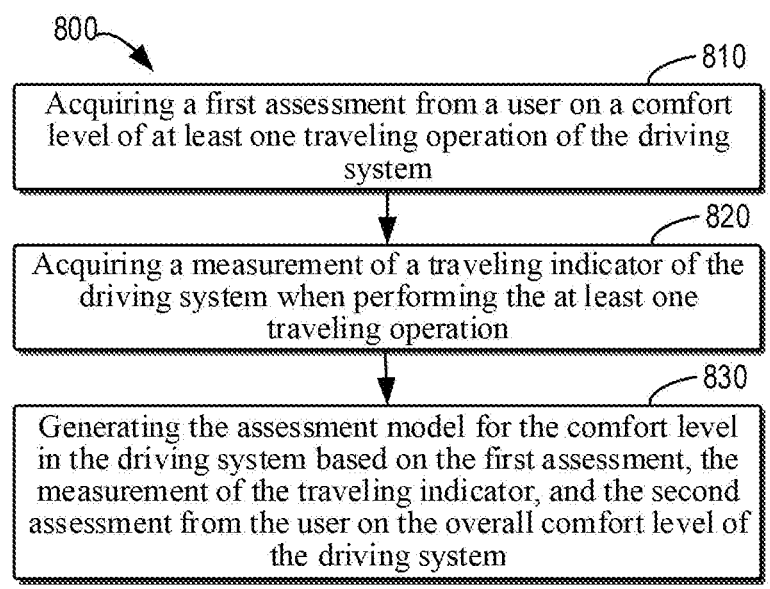
FIG. 8 shows a flowchart of a process for training an assessment model for comfort level according to an embodiment of the disclosure.

FIG. 8 shows a flowchart of a process 800 for generating an assessment model for comfort level in a driving system according to an embodiment of the disclosure. The process 800 may be implemented by the computing device 102. In 810, the computing device 102 acquires a first assessment from a user on a comfort level of at least one traveling operation of the driving system. In 820, the computing device 102 acquires a measurement of a traveling indicator of the driving system when performing the at least one traveling operation. In 830, the computing device 102 generates the assessment model for the comfort level in the driving system based on the first assessment, the measurement of the traveling indicator, and the second assessment from the user on the overall comfort level of the driving system. The outputs of the assessment model for the comfort level include generating a first association between the comfort level of the at least one traveling operation and the traveling indicator, and generating a second association between the overall comfort level of the driving system and the comfort level of the at least one traveling operation.

In some embodiments, the process 800 further includes acquiring a third assessment from the user on a comfort level of a sensory experience when the driving system is performing the at least one traveling operation. The generating the first association includes: generating a third association between the comfort level of the at least one traveling operation and the comfort level of the sensory experience based on the first assessment and the third assessment; and generating a fourth association between the comfort level of the sensory experience and the traveling indicator based on the third assessment and the measurement of the traveling indicator.

In some embodiments, the process 800 further includes dividing a range of scores for comfort levels associated with the first assessment and the second assessment into a plurality of comfort level gradings, for using by the user in the assessment process. Each of the comfort level gradings corresponds to a corresponding score interval in the range of scores for the comfort levels.

In some embodiments, the dividing the range of scores for the comfort levels into the plurality of comfort level gradings includes: acquiring historical assessment data for a comfort level of a reference driving system, the historical assessment data including a score for a comfort level selected from the range of scores for the comfort levels and a corresponding comfort level grading; and clustering the historical assessment data to determine score intervals corresponding to the plurality of comfort level gradings in the range of scores for the comfort levels.

In some embodiments, the driving system includes at least one of an autonomous driving system or a non-autonomous driving system.

Figure 9:
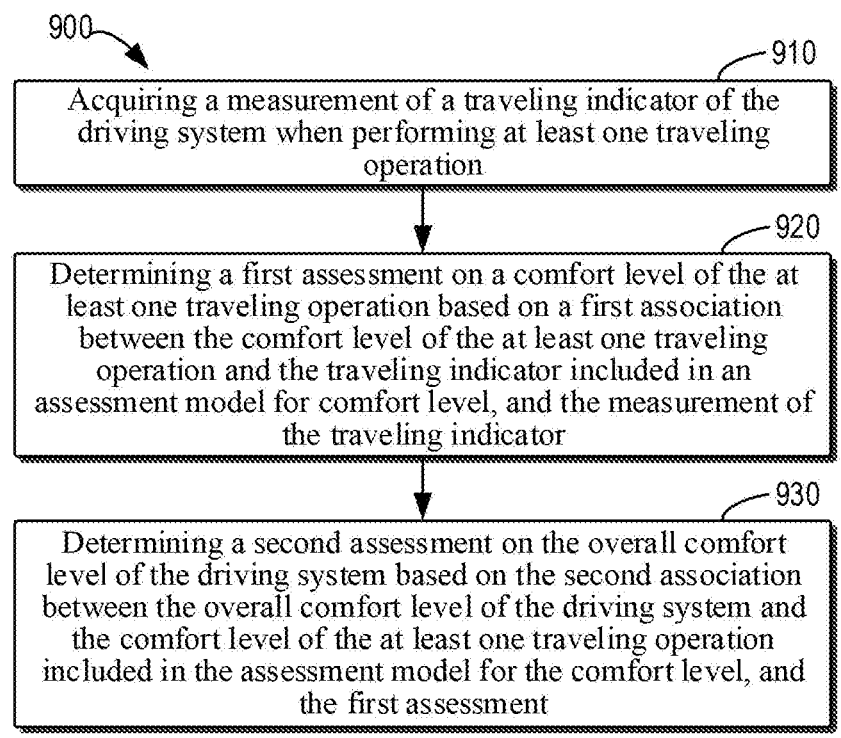
FIG. 9 shows a flowchart of a process for assessing a comfort level of a driving system according to an embodiment of the disclosure.

FIG. 9 shows a flowchart of a process 900 for assessing a comfort level of a driving system according to an embodiment of the disclosure. The process 900 may be implemented by the computing device 102. In 910, the computing device 102 acquires a measurement of a traveling indicator of the driving system when performing at least one traveling operation. In 920, the computing device 102 determines a first assessment on a comfort level of the at least one traveling operation based on a first association between the comfort level of the at least one traveling operation and the traveling indicator included in an assessment model for comfort level, and the measurement of the traveling indicator. In 930, the computing device 102 determines a second assessment on the overall comfort level of the driving system based on the second association between the overall comfort level of the driving system and the comfort level of the at least one traveling operation included in the assessment model for the comfort level, and the first assessment.

In some embodiments, the first association includes the third association between the comfort level of the at least one traveling operation and the comfort level of the sensory experience, and the fourth association between the comfort level of the sensory experience and the traveling indicator. The determining the first assessment includes: determining a third assessment from the user on the comfort level of the sensory experience when the driving system is performing the at least one traveling operation based on the fourth association and the measurement of the traveling indicator; and determining the first assessment based on the third association and the third assessment.

In some embodiments, the process 900 further includes: comparing a value of the second assessment with an overall comfort level threshold; and providing an indication of the overall comfort level of the driving system meeting comfort requirements, in response to the value of the second assessment being greater than the overall comfort level threshold.

In some embodiments, the process 900 further includes: comparing a value of the first assessment with a comfort level threshold of an operation associated with the at least one traveling operation, in response to the value of the second assessment being less than the overall comfort level threshold; and providing an indication of the traveling indicator associated with the at least one traveling operation, in response to the value of the first assessment being less than the comfort level threshold of the operation, to facilitate debugging the driving system for the traveling indicator.

In some embodiments, the process 900 further includes: providing an indication of at least one of the first assessment or the second assessment, to facilitate debugging the driving system.

In some embodiments, the first assessment and the second assessment are selected from a same range of scores for comfort levels, the range of scores for the comfort levels is divided into a plurality of comfort level gradings, and each of the comfort level gradings corresponds to a corresponding score interval in the range of scores for the comfort levels.

In some embodiments, the driving system includes at least one of an autonomous driving system or a non-autonomous driving system.

Figure 10:
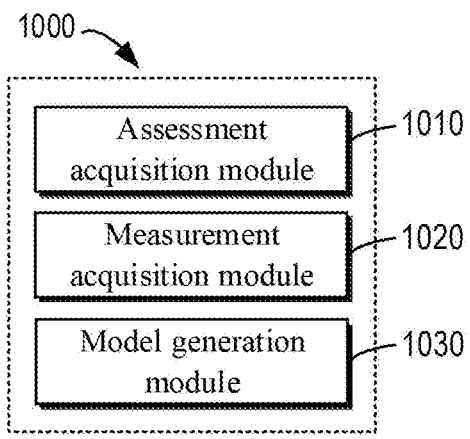
FIG. 10 shows a schematic block diagram of an apparatus for training an assessment model for comfort level according to an embodiment of the disclosure.

FIG. 10 shows a schematic block diagram of an apparatus 1000 for generating an assessment model for comfort level in a driving system according to an embodiment of the disclosure. As shown in FIG. 10, the apparatus 1000 includes: an assessment acquisition module 1010, configured for acquiring a first assessment from a user on a comfort level of at least one traveling operation of the driving system; a measurement acquisition module 1020, configured for acquiring a measurement of a traveling indicator of the driving system when performing the at least one traveling operation; and a model generation module 1030, configured for generating the assessment model for the comfort level in the driving system based on the first assessment, the measurement of the traveling indicator, and a second assessment from the user on an overall comfort level of the driving system, the model generation module being further configured for generating a first association between the comfort level of the at least one traveling operation and the traveling indicator, and generating a second association between the overall comfort level of the driving system and the comfort level of the at least one traveling operation.

In some embodiments, the apparatus 1000 further includes: a range division module, configured for dividing a range of scores for comfort levels associated with the first assessment and the second assessment into a plurality of comfort level gradings, for using by the user in the assessment process. Each of the comfort level gradings corresponds to a corresponding score interval in the range of scores for the comfort levels.

In some embodiments, the apparatus 1000 further includes: the range division module being further configured for: acquiring historical assessment data for a comfort level of a reference driving system, the historical assessment data including a score for a comfort level selected from the range of scores for the comfort levels and a corresponding comfort level grading; and clustering the historical assessment data to determine score intervals corresponding to the plurality of comfort level gradings in the range of scores for the comfort levels.

In some embodiments, the driving system includes at least one of an autonomous driving system or a non-autonomous driving system.

Figure 11:
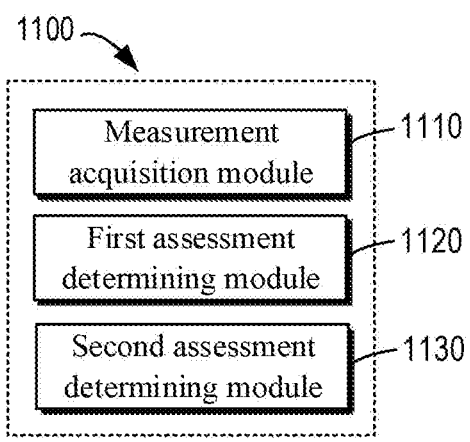
FIG. 11 shows a schematic block diagram of an apparatus for assessing a comfort level of a driving system according to an embodiment of the disclosure.

FIG. 11 shows a schematic block diagram of an apparatus 1100 for assessing a comfort level of a driving system according to an embodiment of the disclosure. As shown in FIG. 11, the apparatus 1100 includes: a measurement acquisition module 1110, configured for acquiring a measurement of a traveling indicator of the driving system when performing at least one traveling operation; and a first assessment determining module 1120, configured for determining a first assessment on a comfort level of the at least one traveling operation based on a first association between the comfort level of the at least one traveling operation and the traveling indicator included in an assessment model for comfort level, and the measurement of the traveling indicator; and a second assessment determining module 1130, configured for determining a second assessment on an overall comfort level of the driving system based on a second association between the overall comfort level of the driving system and the comfort level of the at least one traveling operation included in the assessment model for the comfort level, and the first assessment.

In some embodiments, the first association includes a third association between the comfort level of the at least one traveling operation and a comfort level of a sensory experience, and a fourth association between the comfort level of the sensory experience and the traveling indicator, and the first assessment determining module 1120 is further configured for: determining a third assessment from a user on the comfort level of the sensory experience when the driving system is performing the at least one traveling operation, based on the fourth association and the measurement of the traveling indicator; and determining the first assessment based on the third association and the third assessment.

In some embodiments, the apparatus 1100 further includes: a comparison module, configured for comparing a value of the second assessment with an overall comfort level threshold; and an indication providing module, configured for providing an indication of the overall comfort level of the driving system meeting comfort requirements, in response to the value of the second assessment being greater than the overall comfort level threshold.

In some embodiments, the comparison module is further configured for: comparing a value of the first assessment with a comfort level threshold of an operation associated with the at least one traveling operation, in response to the value of the second assessment being less than the overall comfort level threshold; and the indication providing module is further configured for: providing an indication of the traveling indicator associated with the at least one traveling operation, in response to the value of the first assessment being less than the comfort level threshold of the operation, to facilitate debugging the driving system for the traveling indicator.

In some embodiments, the apparatus 1100 further includes: an assessment providing module, configured for providing an indication of at least one of the first assessment or the second assessment, to facilitate debugging the driving system.

In some embodiments, the first assessment and the second assessment are selected from a same range of scores for comfort levels, the range of scores for the comfort levels is divided into a plurality of comfort level gradings, and each of the comfort level gradings corresponds to a corresponding score interval in the range of scores for the comfort levels.

In some embodiments, the driving system includes at least one of an autonomous driving system or a non-autonomous driving system.

Figure 12:
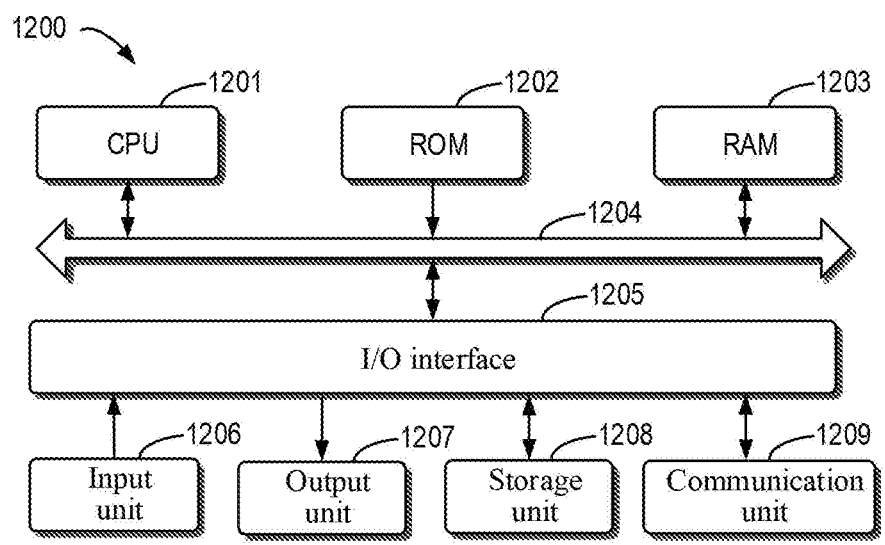
FIG. 12 shows a block diagram of a computing device capable of implementing a plurality of embodiments of the disclosure.

FIG. 12 shows a schematic block diagram of an exemplary device 1200 capable of implementing an embodiment of the disclosure. The device 1200 may be used for implementing the computing device 102 in FIG. 1. As shown in the figure, the device 1200 includes a central processing unit (CPU) 1201, which may perform a variety of appropriate operations and processing based on a computer program instruction stored in a read only memory (ROM) 1202 or a computer program instruction loaded from a storage unit 1208 to a random access memory (RAM) 1203. A variety of programs and data required for operations of the device 1200 may also be stored in the RAM 1203. The CPU 1201, the ROM 1202 and the RAM 1203 are connected to each other through a bus 1204. An input/output (I/O) interface 1205 is also connected to the bus 1204.

A plurality of components in the device 1200 is connected to the I/O interface 1205, including: an input unit 1206, such as a keyboard, or a mouse; an output unit 1207, such as various types of displayers, or speakers; a storage unit 1208, such as a magnetic disk, or an optical disk; and a communication unit 1209, such as a network card, a modem, or a wireless communication transceiver. The communication unit 1209 allows the device 1200 to exchange information/data with other devices through at least one of the Internet computer network or various telecommunication networks.

The processing unit 1201 performs the methods and processing described hereinbefore, such as at least one of the process 800 or the process 900. For example, in some embodiments, at least one of the process 800 or the process 900 may be implemented as a computer software program that is tangibly included in a machine readable medium, such as the storage unit 1208. In some embodiments, a part or all of a computer program may be loaded into and/or installed in the device 1200 via at least one of the ROM 1202 or the communication unit 1209. When a computer program is loaded into the RAM 1203 and executed by the CPU 1201, one or more steps of at least one of the process 800 or the process 900 described hereinbefore may be performed. Alternatively, in other embodiments, the CPU 1201 may be configured for performing at least one of the process 800 or the process 900 in any other appropriate way (for example, with the help of firmware).

The functions described hereinbefore may be performed at least partially by one or more logical components of hardware. For example, non-limiting usable exemplary hardware logical components include: a Field Programmable Gate Array (FPGA), an Application Specific integrated Circuit (ASIC), an Application Specific Standard Product (ASSP), a System on Chip (SOC), a Complex Programmable Logic Device (CPLD), and the like.

The program code for implementing the method according to the disclosure may be written in any combination of one or more programming languages. The program code may be provided to a general purpose computer, a special purpose computer, or a processor or controller of other programmable data processing apparatus, to enable the program code to implement, when executed by the processor or the controller, functions/operations provided in at least one of the flowcharts or block diagrams. The program code may be executed entirely on a machine, executed partially on a machine, executed partially on a machine as a stand-alone software package and executed partially on a remote machine, or executed entirely on a remote machine or server.

In the context of the disclosure, the machine readable medium may be a tangible medium that may contain or store programs for use by an instruction execution system, apparatus, or device, or use by a combination of the instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, device, or any suitable combination thereof. A more specific example of the machine readable medium includes an electrical connection based on one or more wires, a portable computer disk, a hard disk, a random access memory (RAM), a read only memory (ROM), an erasable programmable read only memory (EPROM or flash memory), an optical fiber, a compact disk read only memory (CD-ROM), an optical storage device, a magnetic storage device, or any suitable combination thereof.

Furthermore, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Similarly, while the above discussion contains many specific implementation details, these should not be construed as limitations on the scope of the disclosure. Certain features that are described in the context of separate embodiments can also be implemented in combination in a single implementation. Conversely, various features that are described in the context of a single implementation can also be implemented in multiple implementations separately or in any suitable subcombination.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for updating software of a driving system, the method comprising:
   acquiring a first assessment from a user on a comfort level of at least one traveling operation of the driving system;
   acquiring a measurement of a traveling indicator of the driving system when performing the at least one traveling operation, the measurement of the traveling indicator being monitored by a sensor of the driving system;
   generating an assessment model for the comfort level of the driving system based on the first assessment, the measurement of the traveling indicator, and a second assessment from the user on an overall comfort level of the driving system, comprising:
      generating a first association between the comfort level of the at least one traveling operation and the traveling indicator, and
      generating a second association between the overall comfort level of the driving system and the comfort level of the at least one traveling operation; and
   determining, based on the assessment model for the comfort level of the driving system, an overall comfort score for the driving system; and
      based on the overall comfort score for the driving system being below a score threshold, updating the software of the driving system from a first version to a second version and adjusting a mechanical structure of the driving system, wherein an overall comfort score associated with the second version is above the score threshold.

2. The method according to claim 1, further comprising:
   acquiring a third assessment from the user on a comfort level of a sensory experience when the driving system is performing the at least one traveling operation, and the generating the first association comprising:
   generating a third association between the comfort level of the at least one traveling operation and the comfort level of the sensory experience based on the first assessment and the third assessment; and
   generating a fourth association between the comfort level of the sensory experience and the traveling indicator based on the third assessment and the measurement of the traveling indicator.

3. The method according to claim 1, further comprising:
   dividing a range of scores for comfort levels associated with the first assessment and the second assessment into a plurality of comfort level gradings, for using by the user in the assessment process, each of the comfort level gradings corresponding to a corresponding score interval in the range of scores for the comfort levels.

4. The method according to claim 3, wherein the dividing the range of scores for the comfort levels into the plurality of comfort level gradings comprises:
   acquiring historical assessment data for a comfort level of a reference driving system, the historical assessment data including a score for a comfort level selected from the range of scores for the comfort levels and a corresponding comfort level grading; and
   clustering the historical assessment data to determine score intervals corresponding to the plurality of comfort level gradings in the range of scores for the comfort levels.

5. The method according to claim 1, wherein the driving system comprises at least one of an autonomous driving system or a non-autonomous driving system.

6. A method for assessing a comfort level of a driving system, comprising:
   acquiring a measurement of a traveling indicator of the driving system when performing at least one traveling operation, the measurement of the traveling indicator being monitored by a sensor of the driving system;
   determining a first assessment on a comfort level of the at least one traveling operation based on a first association between the comfort level of the at least one traveling operation and the traveling indicator included in an assessment model for comfort level, and the measurement of the traveling indicator;
   determining a second assessment on an overall comfort level of the driving system based on a second association between the overall comfort level of the driving system and the comfort level of the at least one traveling operation included in the assessment model for the comfort level, and the first assessment;
   determining, based on the assessment model for the comfort level, an overall comfort score for the driving system; and
   based on the overall comfort score for the driving system being below a score threshold, updating software of the driving system from a first version to a second version and adjusting a mechanical structure of the driving system, wherein an overall comfort score associated with the second version is above the score threshold.

7. The method according to claim 6, wherein the first association comprises a third association between the comfort level of the at least one traveling operation and a comfort level of a sensory experience, and a fourth association between the comfort level of the sensory experience and the traveling indicator, and the determining the first assessment comprises:
   determining a third assessment from a user on the comfort level of the sensory experience when the driving system is performing the at least one traveling operation, based on the fourth association and the measurement of the traveling indicator; and
   determining the first assessment based on the third association and the third assessment.

8. The method according to claim 6, further comprising:
comparing a value of the second assessment with an overall comfort level threshold; and
providing an indication of the overall comfort level of the driving system meeting comfort requirements, in response to the value of the second assessment being greater than the overall comfort level threshold.

9. The method according to claim 8, further comprising:
comparing a value of the first assessment with a comfort level threshold of an operation associated with the at least one traveling operation, in response to the value of the second assessment being less than the overall comfort level threshold; and
providing an indication of the traveling indicator associated with the at least one traveling operation, in response to the value of the first assessment being less than the comfort level threshold of the operation, to facilitate debugging the driving system for the traveling indicator.

10. The method according to claim 6, further comprising:
providing an indication of at least one of the first assessment or the second assessment, to facilitate debugging the driving system.

11. The method according to claim 6, wherein the first assessment and the second assessment are selected from a same range of scores for comfort levels, the range of scores for the comfort levels is divided into a plurality of comfort level gradings, and each of the comfort level gradings corresponds to a corresponding score interval in the range of scores for the comfort levels.

12. The method according to claim 6, wherein the driving system comprises at least one of an autonomous driving system or a non-autonomous driving system.

13. An apparatus for updating software of a driving system, comprising:
at least one processor; and
a memory storing instructions, the instructions when executed by the at least one processor, cause the at least one processor to perform operations, the operations comprising:
acquiring a first assessment from a user on a comfort level of at least one traveling operation of the driving system;
acquiring a measurement of a traveling indicator of the driving system when performing the at least one traveling operation, the measurement of the traveling indicator being monitored by a sensor of the driving system;
generating an assessment model for the comfort level in the driving system based on the first assessment, the measurement of the traveling indicator, and a second assessment from the user on an overall comfort level of the driving system, comprising:
generating a first association between the comfort level of the at least one traveling operation and the traveling indicator, and
generating a second association between the overall comfort level of the driving system and the comfort level of the at least one traveling operation; and
determining, based on the assessment model for the comfort level, an overall comfort score for the driving system; and
based on the overall comfort score for the driving system being below a score threshold, updating software of the driving system from a first version to a second version and adjusting a mechanical structure of the driving system, wherein an overall comfort score associated with the second version is above the score threshold.

14. The apparatus according to claim 13, the operations further comprising:
acquiring a third assessment from the user on a comfort level of a sensory experience when the driving system is performing the at least one traveling operation, and
the generating the first association comprising:
generating a third association between the comfort level of the at least one traveling operation and the comfort level of the sensory experience based on the first assessment and the third assessment; and
generating a fourth association between the comfort level of the sensory experience and the traveling indicator based on the third assessment and the measurement of the traveling indicator.

15. The apparatus according to claim 13, the operations further comprising:
dividing a range of scores for comfort levels associated with the first assessment and the second assessment into a plurality of comfort level gradings, for using by the user in the assessment process, each of the comfort level gradings corresponding to a corresponding score interval in the range of scores for the comfort levels.

16. The apparatus according to claim 15, wherein the dividing the range of scores for the comfort levels into the plurality of comfort level gradings comprises:
acquiring historical assessment data for a comfort level of a reference driving system, the historical assessment data including a score for a comfort level selected from the range of scores for the comfort levels and a corresponding comfort level gradings; and
clustering the historical assessment data to determine score intervals corresponding to the plurality of comfort level gradings in the range of scores for the comfort levels.

17. The apparatus according to claim 13, wherein the driving system comprises at least one of an autonomous driving system or a non-autonomous driving system.

18. An apparatus for assessing a comfort level of a driving system, comprising:
at least one processor; and
a memory storing instructions, the instructions when executed by the at least one processor, cause the at least one processor to perform operations, the operations comprising:
acquiring a measurement of a traveling indicator of the driving system when performing at least one traveling operation, the measurement of the traveling indicator being monitored by a sensor of the driving system;
determining a first assessment on a comfort level of the at least one traveling operation based on a first association between the comfort level of the at least one traveling operation and the traveling indicator included in an assessment model for the comfort level, and the measurement of the traveling indicator;
determining a second assessment on an overall comfort level of the driving system based on a second association between the overall comfort level of the driving system and the comfort level of the at least one traveling operation included in the assessment model for the comfort level, and the first assessment;
determining, based on the assessment model for the comfort level, an overall comfort score for the driving system; and
based on the overall comfort score for the driving system being below a score threshold, updating software of the driving system from a first version to a second version and adjusting a mechanical structure of the driving system, wherein an overall comfort score associated with the second version is above the score threshold.

19. The apparatus according to claim 18, wherein the first association comprises a third association between the comfort level of the at least one traveling operation and a comfort level of a sensory experience, and a fourth association between the comfort level of the sensory experience and the traveling indicator, and the determining the first assessment comprises:
   determining a third assessment from a user on the comfort level of the sensory experience when the driving system is performing the at least one traveling operation, based on the fourth association and the measurement of the traveling indicator; and
   determining the first assessment based on the third association and the third assessment.

20. The apparatus according to claim 18, the operations further comprising:
   comparing a value of the second assessment with an overall comfort level threshold; and
   providing an indication of the overall comfort level of the driving system meeting comfort level requirements, in response to the value of the second assessment being greater than the overall comfort level threshold.

21. The apparatus according to claim 20, the operations further comprising:
   comparing a value of the first assessment with a comfort level threshold of an operation associated with the at least one traveling operation, in response to the value of the second assessment being less than the overall comfort level threshold; and
   providing an indication of the traveling indicator associated with the at least one traveling operation, in response to the value of the first assessment being less than the comfort level threshold of the operation, to facilitate debugging the driving system for the traveling indicator.

22. The apparatus according to claim 18, the operations further comprising:
   providing an indication of at least one of the first assessment or the second assessment, to facilitate debugging the driving system.

23. The apparatus according to claim 18, wherein the first assessment and the second assessment are selected from a same range of scores for comfort levels, the range of scores for the comfort levels is divided into a plurality of comfort level gradings, and each of the comfort level gradings corresponds to a corresponding score interval in the range of scores for the comfort levels.

24. The apparatus according to claim 18, wherein the driving system comprises at least one of an autonomous driving system or a non-autonomous driving system.

* * * * *